United States Patent Office 3,644,457
Patented Feb. 22, 1972

3,644,457
PREPARATION OF STABLE LIQUID DIPHENYL-
METHANE DIISOCYANATES
Klaus König and Erwin Müller, Leverkusen, and Hans
Holtschmidt, Leverkusen-Steinbuchel, Germany, assignors to Farbenfabriken Bayer Aktiengesellschaft,
Leverkusen, Germany
No Drawing. Filed Feb. 28, 1968, Ser. No. 708,787
Claims priority, application Germany, Mar. 8, 1967,
F 51,751
Int. Cl. C07c *119/04*
U.S. Cl. 260—453 SP
1 Claim

ABSTRACT OF THE DISCLOSURE

Solid 4,4'- and/or 2,4'-diphenylmethane diisocyanate are reacted with a branched aliphatic dihydroxy compound in the molar ratio of 0.1 to 0.3 mol of dihydroxy compound per mol of diisocyanate to prepare a product which is liquid at room temperature.

---

This invention relates to organic diisocyanates and more particularly to mixtures of organic diisocyanates based on 4,4'- and/or 2,4'-diphenylmethane diisocyanate which are liquid at room temperature.

It is well known that diisocyanates which are liquid at room temperature have numerous advantages over solid diisocyanates because they are easier to mix and work with. However, diisocyanates which are liquid at room temperature and which are used on a large technical scale, such as toluylene diisocyanate or hexamethylene diisocyanate, are as a rule physiologically harmful owing to their high vapor pressure and therefore can only be handled if certain precautions are taken. For this reason, various attempts have been made, either to start with diisocyanates that are normally liquid at room temperature and to reduce their physiological effects by certain procedures or to start with diisocyanates that are solid at room temperature and convert these into the liquid form by certain measures. In both cases, however, one usually obtains, either isocyanates of higher valency, i.e. tri- or polyisocyanates or higher molecular weight diisocyanates or a combination of these effects that is, higher molecular weight tri- or polyisocyanates.

The most important diisocyanates which are solid at room temperature and which are readily available on a large commercial scale are 4,4'-diphenylmethane diisocyanate and the 2,4'-isomers thereof which melt at 39° C. and 34.5° C. respectively. Attempts have already been made also to liquify the 4,4'-diphenylmethane diisocyanate isomer. Thus, for example according to German patent specification 1,092,007, 4,4'-diphenylmethane diisocyanate is subjected to a heat treatment at temperatures above 150° C., part of the diisocyanate groups present being used up in carbodiimide formation. The diisocyanate groups still present partly react with the resulting carbodiimide groups to form uretoneimine, so that the liquid products of the process again are no longer diisocyanates but polyisocyanates. This manifests itself in the reaction of the products with bifunctional low molecular weight or higher molecular weight hydroxyl compounds, the reaction leading not to soluble linear products but to insoluble cross-linked products.

It is therefore an object of this invention to provide improved liquid organic diisocyanates which are liquid at room temperature. Another object of this invention is to provide a mixture of diphenylmethane diisocyanates which is liquid at room temperature. A further object of this invention is to provide organic diisocyanates which remain liquid even on prolonged storage at low temperatures. Still another object of this invention is to provide an improved process for preparing liquid organic diisocyanates.

The foregoing objects and others which will become apparent from the following description are accomplished in accordance with the invention, generally speaking, by providing a mixture of compounds having free —NCO groups prepared by reacting an aliphatic dihydroxy compound having a branched carbon chain and a molecular weight below 700 with 4,4'- and/or 2,4'-diphenylmethane diisocyanate in the molar ratio of from about 0.1 to about 0.3 mol of dihydroxy compound per mol of diisocyanate.

Thus, it has now surprisingly been found that about 0.1 to about 0.3 mol of an aliphatic dihydroxy compound having a branched carbon chain will react with 1 mol of 4,4'-diphenylmethane diisocyanate and/or the 2,4'-isomer thereof, to yield a liquid, low molecular weight diisocyanate which consists predominantly of diphenylmethane diisocyanate.

The invention also provides a process for the production of diisocyanates which are liquid at room temperature, in which 1 mol of 4,4'- and/or 2,4'-diphenylmethane diisocyanate is reacted with about 0.1 to about 0.3 mol of a branched aliphatic dihydroxy compound under substantially anhydrous conditions.

Surprisingly, these very small quantities of branched aliphatic glycols are sufficient to yield, on reaction with 4,4'- and/or 2,4'-diphenylmethane diisocyanate, a liquid diisocyanate which will remain liquid even on prolonged storage at low temperature.

The liquid diisocyanates which can be prepared according to the invention from 4,4'- and/or 2,4'-diphenylmethane diisocyanate have a very low viscosity and can therefore be worked up very easily, e.g. they can be cast or metered through pumps. In addition they have a very low vapor pressure and are therefore physiologically harmless. If, instead of branched dihydroxy compounds, corresponding quantities of unbranched aliphatic dihydroxy compounds are reacted with 4,4'- or 2,4'-diphenylmethane diisocyanate, crystalline products are obtained which are not technically satisfactory. In contrast to the polyisocyanates which can be prepared according to the above-mentioned German patent specification 1,092,007, the liquid reaction products, since they are diisocyanates, yield soluble polyaddition products when reacted with bifunctional hydroxyl compounds. Since the reaction of 4,4'- and/or 2,4'-diphenylmethane diisocyanate with the branched aliphatic glycols is carried out at relatively low temperatures, preferably below 80° C., the diisocyanate structure of the products of the process is completely preserved. Possible allophanate formation by the reaction of the resulting urethane groups with the isocyanate groups to produce a polyisocyanate does not take place.

The following are examples of branched aliphatic dihydroxy compounds which may be used in the process according to the invention: 1,3-propanediols which contain at least two alkyl groups in the molecule such as 2-ethylhexanediol-(1,3), 2-methylpentanediol-(2,4), 2,2,4-trimethylpentanediol - (1,3), 3 - methyl - 5 - ethylheptanediol-(2,4), 2-methyl-2-propanediol-(1,3) or mixtures thereof. It is preferred to use poly-1,2-propylene ether glycols of molecular weight 134 to 700, such as dipropylene glycol, tripropylene glycol or polypropylene glycol or mixtures thereof.

The process may, for example, be carried out by introducing the branched aliphatic glycols into the diisocyanate at temperatures of about 40 to about 60° C. with stirring and completing the addition reaction at temperatures of up to about 80° C. The isocyanate content of the products of the process amounts to about 15% NCO to about 25% NCO. The difference between the isocyanate content of the pure crystalline diphenylmethane diisocyanate and that of the products of the process corresponds to the amount of branched dihydroxyl compounds employed.

The products of the process can be used for all sorts of different polyaddition reactions in the lacquer and plastics industry, e.g. for the production of polyurethane foams or polyurethane elastomers which are in turn useful for the preparation of cushions or cast gear wheels respectively.

The invention is further illustrated by the following examples in which parts are by weight unless otherwise specified.

EXAMPLE 1

About 5 kg. (20 mol) of 4,4'-diphenylmethane diisocyanate are melted and mixed at about 50° C. with about 800 g. (4 mols) of tripropylene glycol with stirring. The reaction mixture is then slowly heated to about 80° C. and kept for about one hour at this temperature. After cooling to room temperature, a pale yellow liquid which has a viscosity of about 760 cp./25° C. is obtained. The NCO content amounts to about 22.6%.

EXAMPLE 2

About 2 kg. (8 mol) of 4,4'-diphenylmethane diisocyanate are reacted as in Example 1 with about 1.12 kg. (1.6 mol) of a polypropylene glycol of molecular weight 700. A yellow oil of viscosity 16,400 cp./25° C. is obtained, which contains 17.1% of NCO groups.

EXAMPLE 3

A mixture of about 40 g. (0.2 mol) of tripropylene glycol and about 27.4 g. (0.2 mol) of dipropylene glycol is added to about 500 g. (2 mol) of molten 4,4'-diphenylmethane diisocyanate and the reaction is left to proceed at about 80° C. Viscosity about 584 cp./25° C. NCO content about 23.6%.

EXAMPLE 4

About 500 g. (2 mols) of molten 4,4'-diphenylmethane diisocyanate are reacted at between about 40° C. and about 80° C. with about 58.4 g. (0.4 mol) of 2,2,4-trimethylpentanediol-(1,3), also in the molten state. A colorless liquid which has a viscosity of about 494 cp./25° C. is formed. NCO content about 23.8%.

EXAMPLE 5

A mixture of about 26.4 g. (0.2 mol) of 2,2'-diethylpropanediol-1(3) and about 26.4 g. (0.2 mol) of 2-methyl-2-propylpropanediol-(1,3) is added at about 45° C. to about 500 g. (2 mol) of 4,4'-diphenylmethane diisocyanate, whereupon the temperature of the mixture rises to about 69° C. The reaction mixture is then heated for a further hour at about 80° C. The resulting product has a viscosity of about 584 cp./25° C. and an —NCO content of about 24.4%.

EXAMPLE 6

About 150 g. (0.6 mol) of an isomeric mixture of 90% 2,4- and 10% 4,4'-diphenylmethane diisocyanate (M.P. 32 to 34° C.) are melted and about 24 g. (0.12 mol) of tripropylene glycol are added. The reaction mixture is then gradually heated to about 80° C. and this temperature is maintained for about one hour. A yellow liquid is obtained which has a viscosity of about 880 cp./25° C. and contains about 22.5% of —NCO groups. The product does not solidify until the temperature has dropped to —15° C.

EXAMPLE 7

About 250 g. (1 mol) of 4,4'-diphenylmethanediisocyanate are heated for one hour to 80° C. with about 20 g. (0.1 mol) of tripropylene glycol. A liquid is obtained which has a viscosity of 48.7 cp./25° C. and contains about 28.3% of —NCO groups. The product does not solidify until the temperature has dropped to 16.8° C.

EXAMPLE 8

About 2.5 kg. (10 mol) of 4,4'-diphenylmethanediisocyanate and 600 g. (3 mol) of tripropyleneglycol are reacted for one hour to 80° C. A viscous oil is obtained which does not solidify until the temperature has dropped to —10° C. The oil has a viscosity of about 207 cp./25° and contains about 18.7% of —NCO groups.

It is to be understood that the foregoing examples are given for the purpose of illustration and that any other suitable branched chain hydroxy compound, reaction temperature or the like could be employed provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claim.

What is claimed is:

1. A process for the production of diisocyanate compounds which are both stable and liquid at room temperature, which comprises reacting about 1 mol of a diisocyanate selected from the group consisting of 2,4'-diphenylmethane diisocyanate, 4,4'-diphenylmethane diisocyanate and mixtures thereof with from about 0.1 to about 0.3 mol of poly-1,2-propylene ether glycols having a molecular weight of from 134 to 700 at a temperature of from about 40° C. to about 80° C.

References Cited
UNITED STATES PATENTS

| | | | |
|---|---|---|---|
| 2,999,106 | 9/1961 | Prosser et al. | 260—453 |
| 3,248,372 | 4/1966 | Dunge | 260—453 X |
| 3,384,653 | 5/1968 | Erner et al. | 260—453 |
| 3,394,164 | 7/1968 | McClellan | 260—453 |
| 3,457,200 | 7/1969 | Critchfield et al. | 260—453 X |

CHARLES B. PARKER, Primary Examiner

D. H. TORRENCE, Assistant Examiner

U.S. Cl. X.R.

260—2.5 AT, 77.5 AT, 453 AR, 453 P, 471 C